Figure 1:
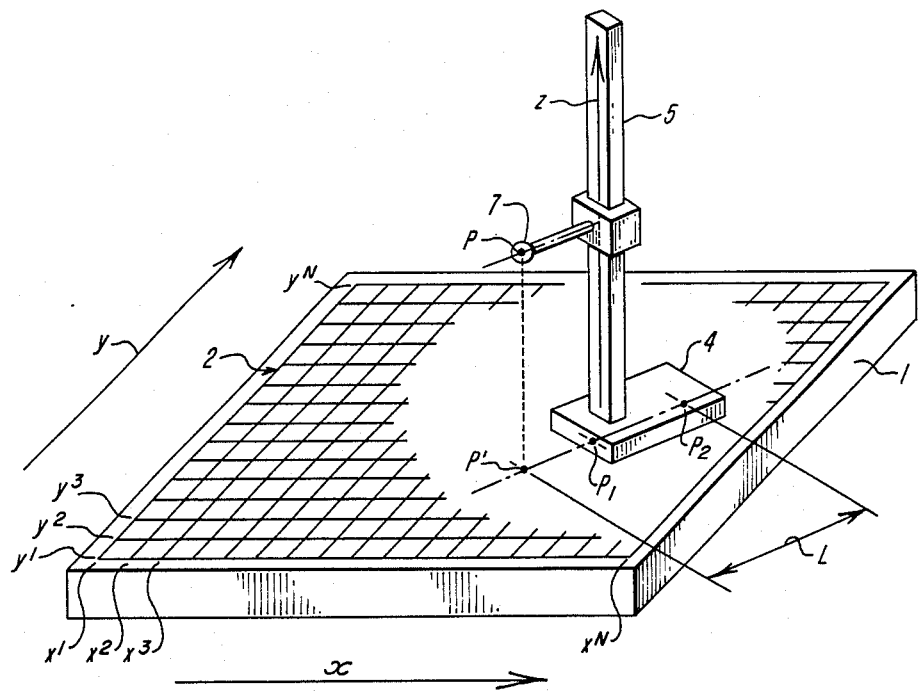

United States Patent [19]

Braman et al.

[11] Patent Number: 4,833,630

[45] Date of Patent: May 23, 1989

[54] METHOD AND APPARATUS FOR THE TRIDIMENSIONAL MEASURING OF AN OBJECT

[75] Inventors: David P. Braman; A. Michael Honer, both of North Kingstown, R.I.

[73] Assignee: Brown & Sharpe Manufacturing Co., Kingstown, R.I.

[21] Appl. No.: 205,088

[22] Filed: Jun. 10, 1988

Related U.S. Application Data

[63] Continuation of Ser. No. 761,356, Aug. 1, 1985, abandoned.

[51] Int. Cl.[4] .......................... G01B 5/20; G01B 11/24
[52] U.S. Cl. ................. 364/559; 364/474.37; 318/569; 318/575; 33/504
[58] Field of Search ............... 364/559, 560, 562–564, 364/474.36, 474.37, 167, 168; 33/503, 504; 318/569, 570, 575

[56] References Cited

U.S. PATENT DOCUMENTS

| | | | |
|---|---|---|---|
| 4,437,151 | 3/1984 | Hurt et al. | 364/559 |
| 4,481,592 | 11/1984 | Jacobs et al. | 364/474.36 |
| 4,484,293 | 11/1984 | Minucciani et al. | 364/560 |
| 4,611,156 | 9/1986 | Feichtinger | 364/474.37 |
| 4,653,011 | 3/1987 | Iwano | 364/560 |
| 4,688,184 | 8/1987 | Taniguti et al. | 364/560 |
| 4,703,443 | 10/1987 | Moriyasu | 364/559 |
| 4,724,525 | 2/1988 | Purcell et al. | 364/474.37 |
| 4,744,039 | 5/1988 | Suzuki et al. | 364/474.37 |

Primary Examiner—Parshotam S. Lall
Assistant Examiner—Brian M. Mattson
Attorney, Agent, or Firm—Wolf, Greenfield & Sacks

[57] ABSTRACT

A method and apparatus provides a three dimensional measurement of a point on an object. A surface with a system for detecting the position of sensors is placed adjacent to the surface and an assembly disposed adjacent to the surface yet freely movable within a plane is parallel to the surface. The assembly includes two sensors whose orthogonal projections into the surfce are detected by the two dimensional detecting system. The assembly further includes a probe, slidable only in a direction perpendicular to the surface and a system for detecting the perpendicular distance of the probe from the surface. In this manner, the orthogonal projection of the probe into the plane is permanently fixed in relation to the two sensors. In practicing the method of the invention, the object to be measured is placed adjacent to the surface and the assembly is moved to a position where the contact on the probe can be moved orthogonally until it contacts the spot on the object whose position is to be measured. A computer then reads the orthogonal distance of the probe from the surface and the position of the orthogonal projections of two sensors on the surface and calculates therefrom the position of the measured point in terms of an X, Y and Z coordinate. In the preferred embodiment, the orthogonal projection of the probe lies on the same line as that formed by the two sensors.

6 Claims, 1 Drawing Sheet

U.S. Patent     May 23, 1989     4,833,630

METHOD AND APPARATUS FOR THE TRIDIMENSIONAL MEASURING OF AN OBJECT

This application is a continuation of application Ser. No. 761,356, filed Aug. 1, 1985.

This invention relates to a method and an apparatus for the tridimensional measuring of an object, such as a part of a mechanism or a machine, according to three reference axes of rectangular coordinates x, y and z.

In all the known measuring methods of this type, the measurement is made following successive steps in which a probe with a spherical contact of a given diameter is translated consecutively or simultaneously along three directions parallel to the three axis of reference up to the point where the spherical contact gets in touch with the part to be measured, in which the position of the spherical contact center tangent to the part to be measured is detected in three linear sensing systems set parallel to the three axes of reference, and in which the coordinates of the tangent point of said spherical contact-piece with the object to be measured, abscissa x, ordinate y and elevation z, are calculated as from the position of its center detected in the three linear detection systems and its diameter.

Known apparatus allowing the application of these methods consist of a plane table which supports the object to be measured and a frame on which are mounted three translation units, each consisting of a slide rail and a carriage sliding along this slide rail. The three slides of the translation units are set parallel to the three reference axes of rectangular coordinates x, y and z. One of the three carriages is sliding along the slide parallel to the elevation z axis and carries the probe with a spherical contact.

On some known apparatus, the plane table is stationary and rigidly connected to the frame and the three translation units are mounted one upon the other in the same manner as the tool-holder carriages of machine-tools, the slide of the first unit being fastened to the frame and the carriage of the last unit carrying the probe with a spherical contact. When a measure is computed, the probe is moved along the three directions parallel to the three reference axis by means of consecutive or simultaneous translations of the carriages of the three translation units to the point where the spherical contact touches the part to be measured.

On other known apparatus, the plane table is mounted on the frame in a mobile manner in two directions parallel to the axis of abscissae x and ordinates y by means of two translation units. The probe is fixed on the carriage of a third translation unit, the slide of which is rigidly connected to the frame and set parallel to the axis of elevations z. When a measure is computed, both the table and the probe are translated simultaneously in order to bring the spherical contact of the latter in touch with the part to be measured. During this step, the table is translated in two directions parallel to the axis of abscissae x and ordinates y and the probe in a direction parallel to the axis of elevations z.

On most known apparatus, sensing means sensitive to the translations of a carriage along a slide is combined with each translation unit and the three translation means constructed in this manner are connected to a measurement transducer circuit in order to convert in quantified figures the coordinates of the tangent point of the spherical contact probe with the object to be measured in relation with the three coordinate axes and according to the measuring method.

Means have also been foreseen to provide the possibility for the operator to select the position of the measurement initialization which defines the zero along each reference axis as well as means for the display, storage and processing of the quantities measured.

The measuring method of the application of which the apparatus mentioned above have been conceived requires heavy and bulky mechanical structures because of the superposition of their translation units. Furthermore, the measuring capacity is proportional to their mass in order to prohibit the introduction of systematic errors, naturally pertaining to the resilience of these structures and which can affect the precision required. There is no other way, indeed, in order to apply this method and in order to quantify the translations of the probe in the three directions of the reference axis than to guide said probe strictly and parallel to these axes by the way of the three mechanical carriage and slide translations units.

On another type of known apparatus, only suitable for the measurement of elevations according to a reference axis of elevation z perpendicular to the surface of a plane table designed to support the object to be measured, the translation means for the probe with a spherical contact comprises a mobile frame with a plane rest base resting on the table and designed to be displaced at random on the surface of the table, a straight slide rigidly connected to the frame and perpendicular to the surface of the base and a carriage which can be moved along the slide and on which is fastened the probe with a spherical contact in an overhanging position with respect to the base. For realizing a measurement, the probe is set in contact with the object to be measured via random displacement of the frame base on the table and by translation of the carriage on the slide. Air cushion sustentation means is foreseen in order to facilitate the displacement of the base on the table.

However, this apparatus, which can be of low mass due to the fact that it consists of only one slide and carriage translation unit, is not foreseen for the tridimensional measuring and has no means allowing the application of such a method.

The object of the tridimensional measuring method according to the present invention is to realize a tridimensional measuring apparatus of a significantly lower mass than that of the known apparatus and presenting the same measuring capacity in the directions of the three reference axis.

For this purpose, the measuring method according to this invention comprises the following steps:

define a plane detection system of the array type consisting of two right-angled coordinate axes x and y;

define two feeling points $P_1$ and $P_2$ in the plane of the detection system defined by the two coordinate axes x and y, the distance between these two points being constant;

define a probe with a spherical contact of a given diameter D, whose center, P, has orthogonal projection P' on the two coordinate axis (x, y) detection system plane in a fixed position and overhanging in relation with the straight line segment connecting the two feeling points $P_1$ and $P_2$;

define a linear detection system according to a third coordinate axis z perpendicular to the plane of the array type plane detection system in order to create with the latter a three right-angled coordinate axes x, y and z detection system, the probe with a spherical contact being movable along the third coordinate axis;

to translate at random the two feeling points $P_1$ and $P_2$ assembly on the plane of the two coordinate axes x and y detection system and move the probe with a spherical contact along the third coordinate axis z of the three coordinate axes x, y and z detection system in order to get it in touch with the object to be measured;

detect the two feeling points $P_1$ and $P_2$ positions with reference to the two coordinate axes x and y plane detection system;

compute the coordinates, abscissa x and ordinate y, of the tangent point of said probe with a spherical contact with the object to be measured in the plane detection system of the two coordinate axes x and y array type from the detected position of the two feeling points $P_1$ and $P_2$, from the relative position of the orthogonal projection P' of the center P of the spherical contact of the probe in relation with the two points, and from the diameter D of the spherical contact;

detect the position of the center P of the spherical contact along the third z coordinate axis of the linear detection system;

compute the elevation z of the spherical contact tangent point with the object to be measured in the linear detection system along the third z coordinate axis from the detected position of the center P of the contact-piece and the diameter D of the latter.

Thus, the guiding of the probe translations along the coordinate axes x and y of the table's plane in order to detect the center of its contact in said plane and to compute its coordinates, abscissa x and ordinate y is no longer necessary. Consequently, there is no more necessity for a strict mechanical linear guiding in these two directions.

The measuring apparatus according to the present invention, conceived to operate this method, has the following in common with the known tridimensional measuring apparatus mentionned hereabove: a plane designed to support the object to be measured, a probe with a spherical contact of a given diameter, mobile in relation with the table and which center defines a reference point significant of its spatial position with respect to the three reference axes, a translation means for the probe with a spherical contact in the directions perpendicular and parallel to the plane table and a measurement transducer circuit able to perceive the probe translations and able to compute in quantified figures the coordinates of the tangent point between the spherical contact of the probe and the object to be measured with respect to the three coordinate axes.

This apparatus is characterized in that the translation means of the probe with a spherical contact comprises a mobile frame with a plane rest base resting on the table and designed to be moved at random on the plane of the table, a straight slide rigidly connected to the frame and perpendicular to the rest saddle plane, and a carriage displaceable along this slide and on which is fastened the probe with a spherical contact in an overhanging position in relation with the rest base, in that the rest base of the mobile frame comprises two reference means defining two points of a line parallel to the table, these two points being consequently in invariable positions in relation with the orthogonal projection of the reference center of the spherical contact of the probe on the table's plane, in that the table is combined with a plane detection means comprising an array of detectors placed along the two first reference axes of right-angled coordinates of its plane, abscissae x and ordinates y, and sensing the position variations of both reference means on the base resulting from the random translation of the latter, in order to detect the position of both these points defined by these reference means with reference to these two first coordinate axes, in that the mobile frame is combined with a linear detection means comprising a sensing means for detecting the carriage translations along the slide in order to detect the position of the center of the contact of the probe along a third coordinate axis, elevation z, materialized by the slide, and in that the measure transducer circuit is connected to the plane and linear detection means and comprises a computing unit able to be programmed in order to compute the coordinates, abscissae x and ordinates y, of the tangent point between the contact of the probe and the object to be measured from the position of the two points detected by the plane detection means, from the relative position of the orthogonal projection of the center of the spherical contact in relation with these two points, and from the diameter of the latter, and to compute the elevation z of the tangent point between the spherical contact and the object to be measured from the position of the center of the spherical contact detected by the linear detection means and the diameter of the latter.

Therefore, the measuring apparatus allows the working of the tridimensional measuring method according to the present invention and fulfulls exactly its object in that, by comparison to the known tridimensional measuring apparatus mentioned hereabove, it comprises one single probe translation means instead of three, which means much less weight for the same measuring capacity.

Furthermore, last but not least, the working facility of the mobile frame supporting the probe on the table allows through random translations to sense the object to be measured in all directions, which is not feasible with the known tridimensional apparatus with which the probe translations are restricted to three straight directions only, conditioned by the three slides of their three translation units.

Figure 2:
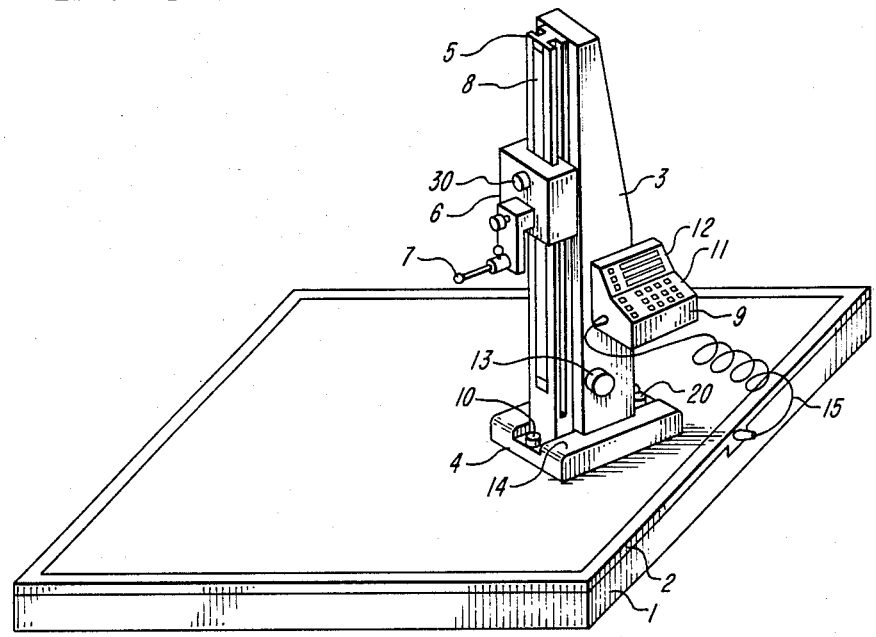

The annexed drawing illustrates geometrically the tridimensional measuring method according to the present invention, and represents, by way of an example, an embodiment form of the measuring apparatus, where FIG. 1 is a schematic view illustrating the measuring method, FIG. 2 is a global view in perspective of the measuring apparatus.

The tridimensional measuring apparatus illustrated by FIG. 2 is globally a combination comprising a plane table 1, designed to support an object to be measured and a translation means for a probe with a spherical contact 7 composed of a mobile frame 3 having a plane rest base 4 resting on the table, a straight slide 5 rigidly connected to the frame and falling at right angles on the plane of the rest saddle 4 and a carriage 6 which can be translated along this slide and on which is fastened the probe with a spherical contact 7 in an overhanging position with respect to the rest base 4.

The plane of the table 1, on which rests the rest base 4 of the translation means of the probe, is composed of the sensible face of a plane sensing means 2, combined to the table, and which defines a plane detection system of the array type having two reference axes of right-angled coordinates x and y; schematically represented in FIG. 1.

This plane sensing system of the array type can be of any known type, such as the electrostatic coordinate system, by example, described by the published British patent application No 2 131 956 and illustrated by FIG. 1 and 2 of this document. The sensing plane of this system is composed of an array of straight electrodes $X_1, X_2 ... X_N$ and $Y_1, Y_2 ... Y_N$ laid out parallel to the two reference axes of coordinates x and y of the table 1 plane.

The rest base 4 of the feeder-spindle translation means comprises two reference means 10 and 20 at a distance from each other and able to influence the sensing means of the array type plane sensing system. If an electrostatic coordinate system of the type mentioned above is used, the sensing means can be made to two punctual electrodes. These two reference means 10 and 20 signify the base position and orientation on the table's plane because they can define two feeling points $P_1$ and $P_2$, illustrated in FIG. 1, on the plane of the two coordinate axis x and y sensing system.

On the other side, the spherical contact 7 of the feeler-spindle can define a marking point of its position in the same plane formed by the orthogonal projection or mark P' of its center P on this plane which position is stationary in relation with the two points $P_1$ and $P_2$ mentioned above. In the illustrated embodiment form, this mark P' of the center P of the spherical contact with the probe lies on the extension of the line segment $\overline{P_1P_2}$ connecting the two feeling points $P_1$ and $P_2$ at a predetermined distance L from one of these two points $P_2$ in the present case. This distance L is calculated to be sufficient in order to prevent the running of the rest base 4 against the object to be measured while measuring.

The mobile frame 3 of the probe translation means is combined with a linear sensing means comprising a device able to sense to the carriage translations 6 along the slide 5, which is formed in the present example by an opto-electronic system of the common type comprising a glass measuring rule 8 fastened parallel to the slide 5 and an opto-electronic pick-up 30, forming the detecting element of this system, fastened to the carriage 6. This detection means, which can be of any other known type, can define a linear detection system along a third coordinate axis z falling at right angle on the plane of the two axes of coordinates x and y plane detection system in order to constitute in combination with the latter a three axis of right-angled coordinates x, y and z detection system and to detect the position of the center P of the spherical contact with the probe along the third coordinate axis, the translations of the carriage and the contact along this coordinate axis being identical.

One can translate the carriage 6 along the slide 5 via a hand wheel 13 connected to a movement transforming system, not illustrated, of the belt and pullies type integrated into the frame 3.

A cabinet 9 with a control console 11 and a figure display panel 12 is fastened to the frame 3 of the probe translation means. The usual feed circuits for the sensors 10, 20, 30 of the plane and linear sensing means are arranged in this cabinet 9 and connected to the plane sensing means 2 by a flexible cable 15. The cabinet contains furthermore the transducer circuits for formatting and quantifying the signals produced by these means as well as a programmable computing unit, a microprocessor by example, connected to these circuits and adapted to compute the coordinates, abscissa x, ordinate y and elevation z of the tangent point between the spherical contact of the probe spindle and the part to be measured.

An air cushion sustentation system 14 of the known type is integrated in the base 4 of the frame 3 in order to facilitate the translation of the base on the plane of the table.

For computing a measure, the operator translates the base 4 of the probe translation means at random on the plane of the table and slides the carriage 6 along the slide 5 until the spherical contact of the probe gets in touch with the object to be measured. This can be the initial measuring point, by example, of which one desires to know the spatial coordinates x, y and z in relation with a zero previously displayed by the operator on the display panel 12 for each of these coordinate axes.

When the translation means is blocked on the table in a tangent position with the spherical contact 7 against the object to be measured, by releasing, for example, the pneumatic pressure of the base sustentation means 14, and when the measuring circuits are activated, the computing unit computes the coordinates of this tangent point in such a way:

the computing of the abscissa x and ordinate y is realized in the array type plane sensing system, from the detected position of the two feeling points $P_1$ and $P_2$ materialized by the reference means 10 and 20 of the saddle 4, from the known relative position of the orthogonal projection or mark P' of the center P of the feeler-spindle spherical contact 7 in relation with these two points, position defined in this case by the distance L, already mentioned, and finally from the diameter D of the spherical contact, the computing of the elevation z is realized, in the linear sensing system along the third coordinate axis z, from the detected position of the center P of the spherical contact which is directly delivered by the opto-electronic pick-up 30 fastened on the carriage 6 and from the diameter D of this contact.

It seems interesting to mention in this case, that is is always possible, for any position and orientation of the rest base 4 on the plane of the table 1, to compute the coordinates x and y of the center P of the spherical contact of the probe in this plane thanks to the detection of the coordinates of the points $P_1$ and $P_2$, which has been made possible. These coordinates can determine the inclination of the line connecting these two points and going through the mark P' of said center. Therefrom, one can notice that this advantage remains for any other position of that mark P' with respect to the segment $\overline{P_1P_2}$; in other words, it is not absolutely necessary that this mark P' should be on the extension of this line segment. Practically, one can probe with use spherical contacts of different lengths and orientations in relation with the rest base 4. In these cases, the operator should, however, change the programming algorithm accordingly.

One can notice also that the air cushion sustentation means 14 for the saddle of the probe translation means is not a requirement. However, one should mention that it could be readily and advantageously remote-controlled in order to facilitate its translations on the table in a known manner, for example with stationary or movable nozzles.

We claim:

1. A method for measuring a position of a point on an object in three dimensional space comprising the steps of:

placing an object to be measured adjacent to a defined planar surface;

defining first and second points on a base, said first and second points being fixed in a known relation with respect to each other, said base being movable only parallel to said planar surface;

providing a probe contact which has a fixed, known position with respect to said base in a direction parallel to said planar surface but which is movable with respect to said base in a direction orthogonal to said planar surface, said contact having an orthogonal projection on said planar surface which represents a third point, said third point being in a fixed, known relation to said first and second points;

moving said base and said probe contact in a direction parallel to said planar surface and moving said probe contact in a direction orthogonal to said planar surface until said probe contact contacts a point on the object to be measured;

detecting a position of said first point and a position of said second point with respect to said planar surface;

calculating from the detected positions of said first and second points and their known relation to said third point, a position of said third point with respect to said planar surface; and measuring a distance from said probe contact to said planar surface in a direction orthogonal to said planar surface.

2. Apparatus for determining a position of a point on an object in three dimensional space comprising:

a planar reference surface;

means for detecting a position in a plane of said surface of an orthogonal projection of a sensor means disposed adjacent to said surface;

an assembly being disposed adjacent to said surface and being freely movable in a direction parallel to said surface, said assembly comprising:

a base;

two point sensors fixed to said base in a known relation to each other, a position of each one of said two point sensors in the plane of said surface being detectable by said detecting means;

a probe having a contact adapted to touch a point on the object to be measured, said contact being movable with respect to said base only orthogonally of said surface so that an orthogonal projection of said contact onto said surface is in a fixed and known relation with respect to said two point sensors;

means for translating said contact of said probe along a line orthogonal to said surface; and means for measuring an orthogonal distance between said surface and said contact; and means for computing a position of said contact from a detected position of each one of said two point sensors and the orthogonal distance of said contact from said reference surface.

3. Apparatus as recited in claim 2 wherein the orthogonal projection of said contact of said probe on said reference surface lies on a line defined by said sensor means.

4. Apparatus as recited in claim 2 wherein said contact of said probe is spherical in shape.

5. A method for measuring a position of a point on an object in three dimensional space comprising the steps of:

placing an object to be measured adjacent to a defined planar surface;

providing an assembly comprising a base and a probe contact;

providing first and second reference points on said base which are in a known, fixed relationship with respect to one another;

fixing said probe contact with respect to said base to prevent movement of said probe contact with respect to said base in a direction parallel to said planar surface, whereby a third point defined by an orthogonal projection on said planar surface of said probe contact is always in a fixed, known relationship with respect to said first and said second reference points;

selectively moving said assembly only in a direction parallel to said planar surface and moving said probe contact only in a direction orthogonal to said planar surface until said probe contact touches a point on an object to be measured;

detecting on said planar surface a position of said first reference point and a position of said second reference point;

calculating a position of said third point on said planar surface from the positions of said first and said second reference points; and measuring a distance from said probe contact to said planar surface in a direction orthogonal to said planar surface.

6. Apparatus for determining a position of a point on an object in three dimensional space comprising:

a generally planar reference surface;

an assembly disposed adjacent to said reference surface and being movable parallel to said reference surface, said assembly comprising:

a base being freely movable only in two dimensions parallel to said reference surface;

two point sensors disposed on said base in a fixed, known relationship with respect to one another;

a probe having a contact adapted to touch a point on the object to be measured;

means for preventing movement of said probe with respect to said base in directions parallel to said reference surface, whereby a third point defined by an orthogonal projection of said contact on said reference surface is always in a known, fixed relationship with respect to said two point sensors;

means for translating said probe in a direction orthogonal to said reference surface; and means for measuring a distance between said reference surface and said contact of said probe in a direction orthogonal to said reference surface;

means for detecting a position of each of said two point sensors on said reference surface; and means for computing a position in three dimensions of said contact from the position on said reference surface of said two point sensors, from the orthogonal distance between said reference surface and said contact, and from the known relationship of said third point with respect to said two point sensors.

* * * * *

UNITED STATES PATENT AND TRADEMARK OFFICE
CERTIFICATE OF CORRECTION

PATENT NO. : 4,833,630

DATED : May 23, 1989

INVENTOR(S) : David P. Braman and A. Michael Honer

It is certified that error appears in the above-identified patent and that said Letters Patent is hereby corrected as shown below:

In paragraph [73] of the cover page, the correct assignees are as follows: Brown & Sharpe Manufacturing Company, North Kingstown, Rhode Island, and Tesa S.A., Renens, Switzerland.

Signed and Sealed this

Nineteenth Day of June, 1990

Attest:

HARRY F. MANBECK, JR.

*Attesting Officer*      *Commissioner of Patents and Trademarks*